(12) United States Patent
Spangenberger et al.

(10) Patent No.: US 12,155,048 B2
(45) Date of Patent: Nov. 26, 2024

(54) RECOVERY OF CONTAMINANT FREE BATTERY MATERIALS

(71) Applicants: Jeffrey S. Spangenberger, Naperville, IL (US); Bryant J. Polzin, Deerfield, IL (US); Jessica L. Durham, Braidwood, IL (US)

(72) Inventors: Jeffrey S. Spangenberger, Naperville, IL (US); Bryant J. Polzin, Deerfield, IL (US); Jessica L. Durham, Braidwood, IL (US)

( * ) Notice: Subject to any disclaimer, the term of this patent is extended or adjusted under 35 U.S.C. 154(b) by 72 days.

(21) Appl. No.: 17/180,621

(22) Filed: Feb. 19, 2021

(65) Prior Publication Data

US 2022/0271355 A1    Aug. 25, 2022

(51) Int. Cl.
| | |
|---|---|
| *H01M 10/54* | (2006.01) |
| *B02C 18/08* | (2006.01) |
| *B02C 18/14* | (2006.01) |
| *B02C 18/18* | (2006.01) |

(52) U.S. Cl.
CPC ............ *H01M 10/54* (2013.01); *B02C 18/08* (2013.01); *B02C 18/142* (2013.01); *B02C 18/146* (2013.01); *B02C 18/182* (2013.01)

(58) Field of Classification Search
CPC ....... H01M 6/52; H01M 10/54; B02C 18/142; B02C 18/146
See application file for complete search history.

(56) References Cited

U.S. PATENT DOCUMENTS

| | | | | |
|---|---|---|---|---|
| 5,052,630 A * | 10/1991 | Hinsey | ................. | B02C 18/146 |
| | | | | 241/243 |
| 5,888,463 A * | 3/1999 | McLaughlin | .......... | C01D 15/00 |
| | | | | 423/179.5 |
| 6,241,170 B1 * | 6/2001 | St. Clair | ................. | B02C 18/16 |
| | | | | 241/167 |
| 2007/0080251 A1 * | 4/2007 | Schwelling | ............. | B02C 18/18 |
| | | | | 241/236 |
| 2018/0166752 A1 * | 6/2018 | Ng | .................... | H01M 10/0525 |
| | | | | 241/243 |
| 2022/0242747 A1 * | 8/2022 | Liao | ....................... | C01G 53/44 |
| | | | | 241/243 |

FOREIGN PATENT DOCUMENTS

| | | | | | |
|---|---|---|---|---|---|
| CN | | 203591854 U | * | 5/2014 | ............ B29B 17/04 |
| WO | WO-2018/218358 A1 | * | 12/2018 | ............ B02C 23/36 |
| WO | WO-2019232574 A1 | * | 12/2019 | ............... C22B 7/00 |
| WO | WO-2020145829 A1 | * | 7/2020 | ............. C22B 1/005 |
| WO | WO-2021161240 A1 | * | 8/2021 | ............. C22B 26/10 |
| WO | WO-2022/032345 A1 | * | 2/2022 | ............ H01M 10/54 |

* cited by examiner

*Primary Examiner* — Debra M Sullivan
*Assistant Examiner* — Matthew Stephens
(74) *Attorney, Agent, or Firm* — CHERSKOV FLAYNIK & GURDA LLC (57) ABSTRACT

A method for producing clean black mass, anode or cathode for subsequent recycling is provided, the method comprising subjecting an intact battery to a shredding process to produce an aggregate, wherein the smallest particle generated is between 2.5 percent and 40 percent of original battery size. Also provided is a shredder for minimizing aggregation of whole batteries, the shredder comprising a shaft defining a longitudinal axis and a latitudinal axis; and a plurality of teeth disposed on said knives which fit on said shaft at an angle to the latitudinal axis selected from 15 degrees and 45 degrees, wherein the teeth have a first proximal end integrally molded to the shaft and a second free distal end.

12 Claims, 12 Drawing Sheets

RECOVERY OF CONTAMINANT FREE BATTERY MATERIALS

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to battery recycling and more specifically, this invention relates to a device and method for the production of clean black mass material from batteries to be used in various recycling processes.

2. Background of the Invention

Lithium-ion batteries have made portable electronics such as mobile phones, GPS devices, hand tools, stationary storage installations, and more significantly electric vehicles, widespread. For example, there are projected to be 140 million electric vehicles on the road by 2030. As a result, a wave of end of life (EOL) batteries is looming on the horizon.

Currently, less than 5 percent of lithium batteries are recycled, compared to virtually 100 percent of lead acid batteries. This disparity is due to a myriad of issues including technical limitations, regulations, and payback.

In many lithium-ion batteries, concentrations of lithium, cobalt, nickel, and other elements are magnitudes higher than those found in natural ores. So, recycling efforts to harvest these elements is akin to reprocessing enriched ores, making such efforts more cost effective than mining native elements. More recycling means less mining, less landfilling of EOL batteries, and less collateral environmental damage.

The targeted metals mentioned above are commonly found in components of cathode material and therefore it is common to preprocess batteries using size reduction and screening processes to generate a cathode and anode powder mixture, called black mass or black sand. The size reduction step in this process is used to break apart the batteries and to abrade the cathode and anode powders off of the collector foils. The screening allows for the separation of the anode and cathode powders from the larger plastic and metal foil and casing materials.

Ultimately, most lithium ion batteries are recycled via high temperature pyrometallurgical processes or hydrometallurgical treatment. For example, pyrometallurgical or smelting facilities use thermal processes to recover lithium-ion battery materials.

Black mass or whole batteries can be processed in pyrometallurgical systems. Black mass is commonly used as a feed material because of the metal rich content and also because shipping black mass from location to location is more cost effective than shipping batteries due to the latter's hazardous shipping classification. When whole or disassembled batteries are fed to a pyrometallurgical process the organics provide energy to the system reducing the energy input requirements. If black mass is used, then a makeup fuel source is required. Organic materials are first driven off or pyrolyzed in a lower temperature section of the furnace (up to 700° C.), then the material is subjected to high-temperature treatment near 1,500° C. to recover a mixed metal alloy fraction that contains cobalt, copper, and nickel, and a slag fraction that contains lithium and aluminum oxides. The mixed metal alloy fraction is subsequently separated into individual metal species through further processing. The slag fraction is typically down-cycled into road aggregate. Plastics, graphite, binder, and carbon are burned away. Pyrometallurgical processing is energy intensive, and requires secondary-stream clean up to limit harmful emissions.

Hydrometallurgical treatment is another process used for recycling lithium-ion batteries and it involves leaching metals from the battery materials. Black mass is usually the exclusive feed material, rather than the battery shred in its entirety, for these processes because it reduces the amount of leaching solution needed by only treating the desired metal rich material as well as the benefit of the reduced shipping costs. Also, if battery shred material in its entirety is introduced to the leach solution, then undesirable metals would be present in the leach solution. The leached metal ions are converted to high-purity inorganic salts that can be used to produce battery-grade cathode materials.

Hydrometallurgy can be used as a stand-alone method to recycle battery material or as the second step of a pyrometallurgical process to purify the metal alloy. Compared to pyrometallurgy, hydrometallurgy has the advantage of increased metal recovery rate, less harmful emissions, and decreased energy input. However, some issues with hydrometallurgical treatment include production of large volumes of liquid waste and increased process complexity with mixtures of cathodes or multi-component cathode materials, such as $LiNi_{1-x-y}Mn_xCo_yO_2$ (NMC).

Both hydrometallurgical and pyrometallurgical methods yield metal salts that need to be processed back into battery cathode materials. The value of these metal salts are low making them a less-economic process.

In an effort to produce higher value products, direct recycling is being studied as a recycling process that repairs the battery's cathode and anode material without breaking down the electrode powders chemical structure via the aforementioned leaching, burning or melting processes.

The objective of direct recycling process is usable anode and cathode powders that have higher value than the metal salts produced in hydrometallurgical or pyrometallurgical processes. A clean, contaminant free black mass is also beneficial to the hydrometallurgical process because the more metal species that are in the leached solution require more separating equipment, and cost, to produce high purity products. Contaminants also result in lower project yields because of overlapping precipitation conditions. For example, copper contamination in black mass reduces the cobalt yield because they have overlapping precipitation conditions. Without copper, more cobalt can be recovered at the same purity, than otherwise. This results in less processing costs, higher yields, and higher purities than with higher levels of copper contamination.

Preprocessing of batteries to produce black mass for further processing begins with the use of shredders/mills to break down the batteries into small pieces. One of the goals is to mechanically remove the electrode powders off of the current collector foils. The electrode powders are then separated from the larger plastics, metals and other materials.

State of the art techniques (e.g., hammermill) use the equipment's energy to abrade the powders off of the current collector foils. A hammermill consists of rotating hammers which strike the material with a certain force to break it apart until it reaches a size small enough to pass through a screen. The force of the hammer can be controlled by the rotation speed and the screen size can be changed.

However, materials that are more flexible (i.e., less friable), like plastic separators or pouch cell casings in batteries, will be torn apart in a hammermill. To maximize powder recovery, the material typically experiences a long residence time in the hammermill where material is slowly stripped from the foil. This significantly lowers throughput of the unit operation. The unintended effect of complete removal of the electrode powders from the collector foils is the extensive reduction of other materials' particle size. These finely ground materials then become hard to remove contaminants in the powder mixture.

The inventors have examined the fine particle contamination generated by state of the art processing via scanning electron microscopy (SEM) imaging and energy dispersive X-ray spectroscopy (EDS) for elemental mapping. The SEM/EDS images showed evidence of graphite anode, NMC cathode, Al foil, and Cu foil pieces from each component of the pouch cells. The small pieces of electrode (<500 nm) in the samples were not attached to their respective foils. This delamination of the electrodes from foil was likely a result of mechanical sheer stress on the edges and friction across the surface of the broken down pieces of cathode and anode.

Pieces of Al and Cu foil with sizes down to 5 nm were also present in SEM images. This is not as critical to current battery recycling processes because those materials are eventually removed during magnetic separation, chemical processing, and purification downstream. But that downstream processing is expensive and also reduces product yield and/or purity, as discussed supra.

The aforementioned contamination is difficult to separate from the generated black mass and often remains throughout the next steps of an ideal direct recycling process. Metal contaminants will show up in the regenerated cathode material and may influence overall performance.

As mentioned above, directly recycling is becoming a more popular method for recycling manufacturing scrap and EOL batteries by maintaining the original structure of battery materials while minimizing downstream processing. But, direct recycling employs the typical state of the art milling, grinding, or crushing preprocessing techniques which produce as fine an aggregate as possible (for example, powders at or below 500 microns). As such, contamination by fine metallic or plastic particles is still an issue.

A need exists in the art for more efficient black mass generation to improve economics and performance of hydrometallurgical-based products, and to enable the introduction of direct recycling. Generally, an optimization of direct recycling of battery components, manufacturing scrap, and EOL cells, is needed. As related to batteries, such a process and system should keep each of the battery's components as intact as possible, i.e., in their native states, inasmuch as up to 40 percent of a lithium-ion battery's weight comes from sought after cathode material in the black mass. The ideal direct recycling process should not shred, mill, crush, grind, or otherwise reduce the structural components of the batteries too finely, rather these components should be kept as large as possible, taking into account state of the art bulk handling limitations. Inasmuch as energy use is directly proportional to the residence time of particles in a shredder, the process and system should have a shredder comprising efficient knife and teeth, configurations to minimize material residence time in shredding chambers. In all, the process should be at least 50 percent more energy efficient than state of the art grinding processes.

SUMMARY OF INVENTION

An object of the invention is to provide a system and method for preparing material to be recycled. This includes recycling material, battery material from manufacturing scrap and EOL cells that overcomes many of the drawbacks of the prior art.

A primary objective of the invention is to provide a low energy alternative to state of the art size reduction technologies. A feature of the invention is that it utilizes a single pass, low-speed process for generating primarily large size (e.g., greater than 500 microns) particles, such that smaller particles constitute five weight percent or less of the material generated. The mechanical processes may be selected from the group consisting of shredding, punching, water-cutting, and combinations thereof. When shredding is utilized, an advantage of the invented shredding process is that the cells pass through the blades and are uniformly cut more quickly than state of the art size reduction equipment.

Another object of the invention is to provide a feedstock for improved battery recycling processes. A feature of the invention is cutting up the battery as little as possible while also isolating the various electrode laminates. The laminates may then be delaminated to recover clean powders. An advantage of the invention is that clean (with respect to contaminants) black mass is generated, on the order of 90 to 99 percent pure, preferably 95-99 percent pure, and most preferably 99 percent pure.

Still another object of the invention is to provide a feedstock for an improved electrolyte removal/recycling process, such as electrolyte removal and material separation. A feature of the invention is the incorporation of shredder teeth wherein the teeth are positioned such that the distance between teeth is similar to and defined by the width of the knife, thus yielding material that is relatively square or rectangular in shape such that the aspect ratio is near 1. An advantage of the invention is that uniform pieces of shredded batteries are generated. Such uniform pieces are easier to work with and separate further down the line.

Yet another object of the present invention is to provide a shredder design to improve feeding efficiencies in battery recycling. A feature of the invention is that the tip (e.g., the teeth) of the knives defining the shredder may be angled so as to protrude from the knife within a range of 0 and 60 degrees, where 15-45 degrees is preferred. An advantage of the invention is that it improves feeding characteristics inasmuch as the angled tip draws material into the shredder. This improves the feeding of battery designs found in electric vehicle batteries (e.g., cylindrical, pouch, and prismatic) especially when they are mixed together.

Another object of the present invention is to provide a shredder design to accommodate unique battery configurations found in electric cars. A feature of the invented shredder is that is its teeth may be curved to form a hook shape. An advantage of the invention is that the hooked shape of the shredder blades provides more aggressive feeding and pulling of materials through the shredder and improves the feeding efficiency of more rigid battery designs (e.g., prismatic cells).

Briefly, the invention provides a method enabling direct recycling of batteries and improving purity and yield in state of the art processes such as hydrometallurgical processes, the method comprising subjecting an intact battery to a shredding process wherein the generation of fine particles is reduced and the fines fraction, less than 500 microns in diameter, constitutes less than 5 weight percent of the shredder residue.

Also provided is a shredder for minimizing aggregation of whole batteries, the shredder comprising shafts defining a longitudinal axis and a latitudinal axis; and a plurality of teeth disposed on knives which fit on said shafts at an angle to the latitudinal axis selected from 15 degrees and 45 degrees, wherein the teeth have a first proximal end integrally molded to the knife body and a second free distal end.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The process described in this patent focuses on a method for recycling lithium-ion batteries called direct recycling. Direct recycling involves maintaining the original chemical structure and process value of battery components by recovering, regenerating, and reusing them directly. By retaining the value of original battery components, a higher revenue potential from the products is possible. The inventors found that maintaining larger aggregate sizes during battery material deconstruction reduces impurity content of recyclable powders generated thereby.

This invention relates to a device and method for the production of clean black mass material from batteries to be used in various recycling process types such as pyrometallurgical, hydrometallurgical, and direct recycling processes.

The invention provides a method and system for recovering contaminant free battery materials to be used as feedstock material in recycling processes. It enables safely shredding batteries/cells in a manner that produces relatively large (ideally ½" to 4" square or rectangular) pieces of cathode, anode, or mixture laminates (active material still attached to the collector foil). The invented knife configuration allows the electrode to remain laminated or otherwise adhered to the foil after a single shredding pass with minimal amount of the electrode broken off the foil. This minimizes fines generation, which is an inherent problem with state of the art shredding processes.

As stated supra, the invention utilizes a single pass, low-speed process for generating large size (e.g., greater than 500 microns) particles, that process selected from the group consisting of shredding, punching, water-cutting, and combinations thereof. Punching involves a specifically sized die (i.e., would work best for prismatic or pouch cell designs) and a press. A substrate, in this case a battery, is placed below the press and pressure is applied to cut and generate consistently sized pieces of material where the shape corresponds to the design of the die used for punching.

Water cutting also yields consistently sized pieces of batteries for recycling. In this method, a high-pressure water jet is mechanically controlled to intricately cut material with specified dimensions through pantographs or more recently, CNC-type controls When a shredder is utilized, the invented process does not use shredder energy to generate excessive amounts of small particles (e.g., less than 500 microns in diameter where this fraction constitutes less than 5 weight percent of the shredder reside) or remove electrode powder from the foil comprising the electrodes. Rather, the shredder's energy is used to simply cut up whole batteries and battery cells into relatively larger pieces that are uniform in size. These large pieces can then be cleaned of the fines contamination and the clean anode and cathode powders can be delaminated from the foils in any number of ways that do not generate contamination providing a clean black mass.

Specifically, a shredder and process for using the shredder has been perfected, with the following aspects of the shredder varied to increase efficiency and reduce fine particle contamination:

Number of shafts;
Knife configuration;
Number and geometry of teeth;
Presence of screen to select shred size; and
Multiple shredder stages.

This invention comprises cutting up the battery as little as possible, while focusing on liberating the various electrode laminates. The objective is to isolate as much cathode and anode laminate material as possible with zero or nominal fine particle generation. Indeed, chemistries such as lithium cobalt oxide (LCO), lithium nickel cobalt aluminum oxide (NCA), lithium nickel manganese cobalt oxide (NMC), or lithium manganese oxide (LMO) may comprise more than 30 to 50 percent of a battery's weight. For example, in some configurations, nickel comprises 15-50 percent of the black mass harvested, cobalt 5-40 percent, and lithium 5-10 percent. In the case of NMC622, nickel comprises 24 weight percent of the black mass harvested, cobalt 8 weight percent, and lithium 5 weight percent.

The laminates are then treated with several steps (e.g. delamination and/or thermal or chemical or mechanical binder removal) to recover the clean powders from the laminates.

No matter what size cells are inputted, the invented process and method generates the same output size of aggregate. This maximizes energy efficiencies. The invention provides a means for generating the most preferred size of shredded recyclable bulk. Specifically, the invention generates shredded sizes ranging from 2.5 percent to 40 percent of original battery size. Pieces from large pouch cell processing are generated near the lower end. Cylindrical cell pieces are generated near the higher end of the range.

The inventors found that the number of shafts (1-vs 2-vs 4-shaft), knife configuration, and the number and geometry of knife teeth can have a significant effect on the size and distribution of shredded material and amount of fine particles produced. Any number of shafts in the shredder can be effective in this invented process. Single shaft systems optimize liberation of the laminates. Multi-shaft systems, and particularly the 4-shaft system has benefits in consistent feeding of the material. Testing was performed on 2-shaft systems, so depicted in FIG. 3.

The RPM rate of a dual shaft shear shredder embodying the aforementioned teeth configurations can be from 5 to 60 RPM, where a range of 10-40 rpm is preferred. A single shaft system may also be used where the RPM rate can be from 5-400 RPM with a range of 25-200 RPM preferred.

A salient feature of the invention is the incorporation of shredder teeth wherein the teeth are positioned such that the distance between teeth is similar to and defined by the width of the knife, thus yielding material that is relatively square or rectangular in shape such that the aspect ratio is preferably less than 4 to 1, and most preferably an aspect ratio at approximately 1 to 1 (e.g., a square configuration). Square shreds flow better than long ribbon-like pieces, the latter of which wind around each other and possibly in various equipment downstream (especially a stirring tank which may be used for electrolyte removal). This is why the invention targets an aspect ratio near 1, give or take a 10 to 25 percent variation relative to the x and y axis of the square.

The improved design provides a range of contaminates between 0 to 1 mole percent (where 0-0.2 mole percent is the preferred range) using the formula $LiNi_{1-x-y}Mn_xCo_yO_2$. Contaminants in the black mass can include, but are not limited to, copper, aluminum, iron, silicon, and stainless steel.

Figure 1A:
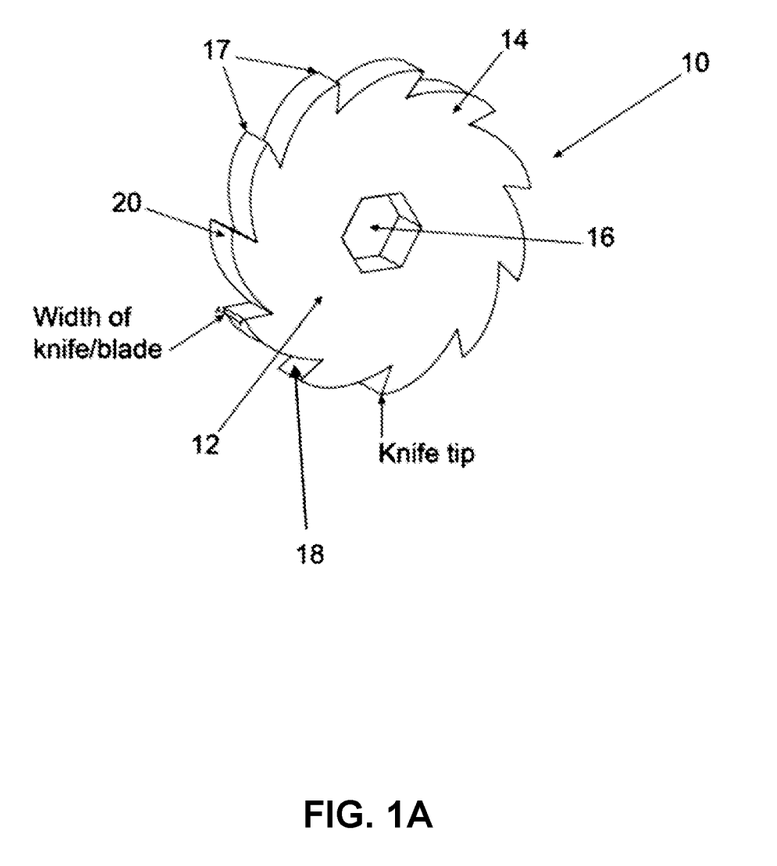
FIG. 1A is an elevational view of a tooth configuration for a direct recycling shredder, in accordance with features of the present invention.

FIG. 1A depicts the invented shredding knife configuration designated as numeral 10. As shown, the knife is disk-shaped having a first surface 12 and a second surface 14, and a periphery. The surfaces 12 and 14 are generally flat parallel with each other, and laterally facing so as to face way from each other. The configuration defines a generally circular cross section having a center region forming an aperture 16.

The periphery of the aperture is formed to slidably receive or otherwise accommodate a spinning axle or shaft (not shown). As such, the periphery may be hexagonal, square, triangular, ovoid or circular in shape, the later utilizing a keyway or other means to prevent independent rotation of the knife about the axle.

The periphery of the knife terminates in circumferentially arranged blades 18 having an edge extending parallel to the axle, and therefore extending orthogonal to the surfaces, 12, 14. While the edge 20 is depicted as continuous and straight, other edges are suitable, such as serrated, concave, convex, or sine wave in shape.

Figure 1B:
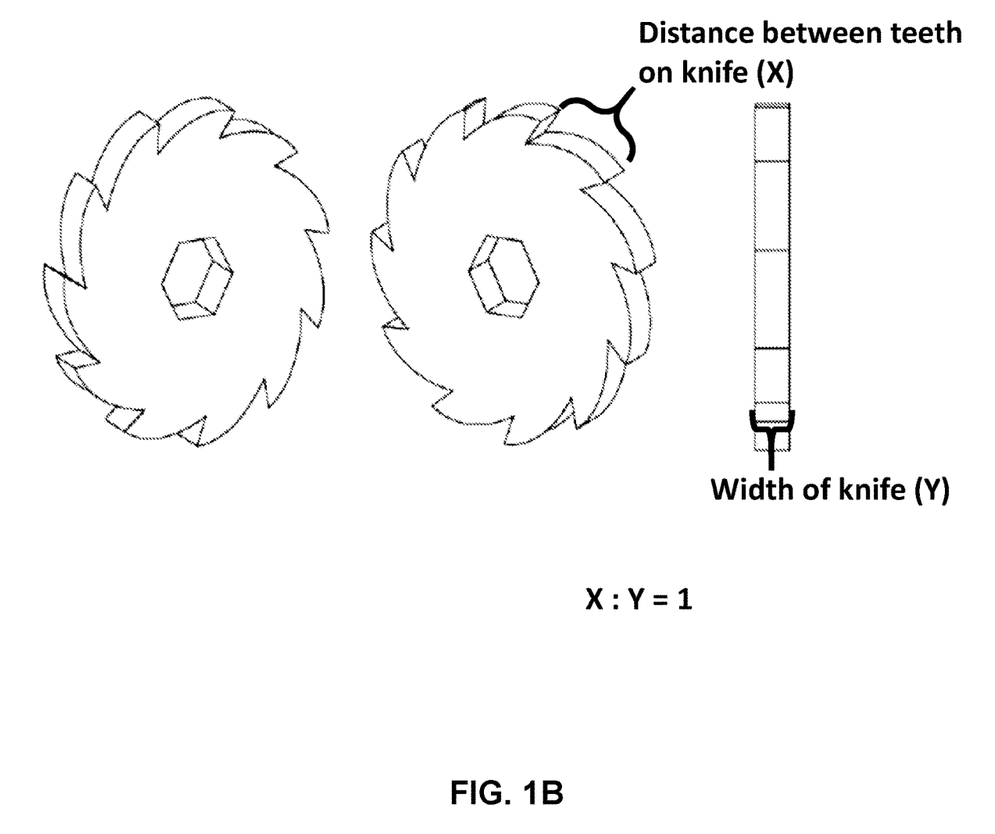
FIG. 1B is a schematic diagram showing the ratio of teeth width to teeth distance, in accordance with features of the present invention.

As depicted in FIGS. 1A and 1B, the knife width is similar to the distance between the knife tips 17. This facilitates the generation of aggregate having an aspect ratio at or close to 1:1. Specifically, FIG. 1B is a schematic diagram showing the ratio of teeth width to teeth distance. The shaft and teeth are shown defining a knife with the distance between teeth X similar to the width Y of the knife. In an embodiment of the invention, the aspect ratio of the distance between the teeth to the width of the knife is near 1.

Figure 2:
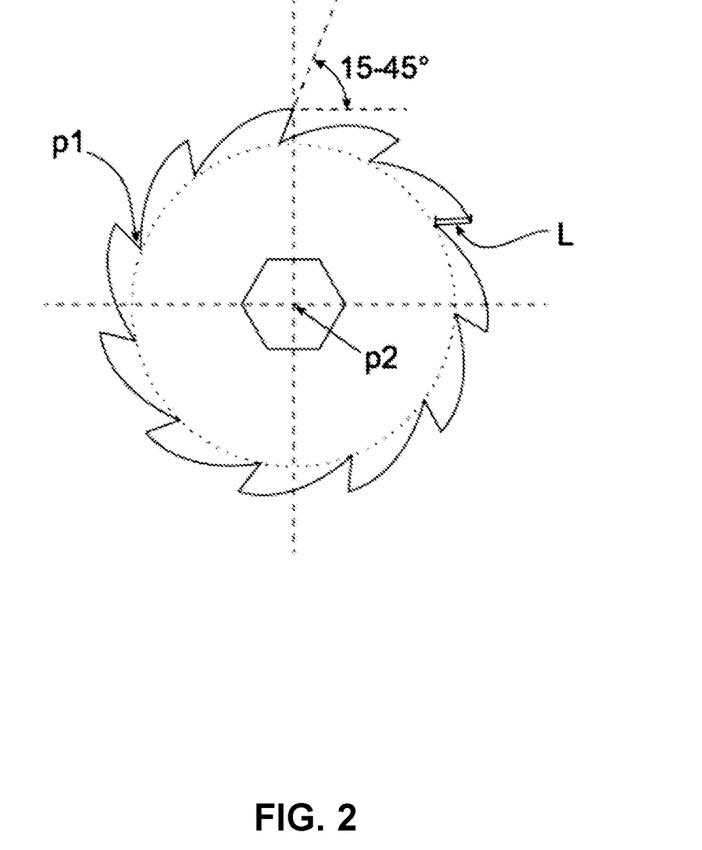
FIG. 2 is a detailed view of a knife cross section, in accordance with features of the present invention.

FIG. 2 is a detailed view of the teeth configuration of the invented shredder knife. Generally, the teeth are symmetrically spaced around the periphery 17 of the knife. Teeth length "L" is defined by a radial projection from the disk. Length ranges from ⅛ inches to 12 inches, and preferably 0.25 inches and 1.5 inches.

Angle of projection of the teeth may vary from 15 to 45 degrees relative to a line defined by a point p1 on the knife periphery and a point p2 at the center of the aperture 16 of the knife. A plurality of teeth are similarly arranged given a plurality of similarly arranged lines. FIGS. 1 and 2 depict eleven teeth, such that two perpendicularly arranged lines define the angles of the teeth, and the teeth are spaced generally symmetrically from each other in approximately a 33 degree arc relative to the periphery 17 of the disk. However, greater or fewer teeth may be provided. For example, if three teeth are provided, the teeth may be symmetrically arranged at approximately a 120 degree arc relative to each other along the periphery 17.

Figure 3:
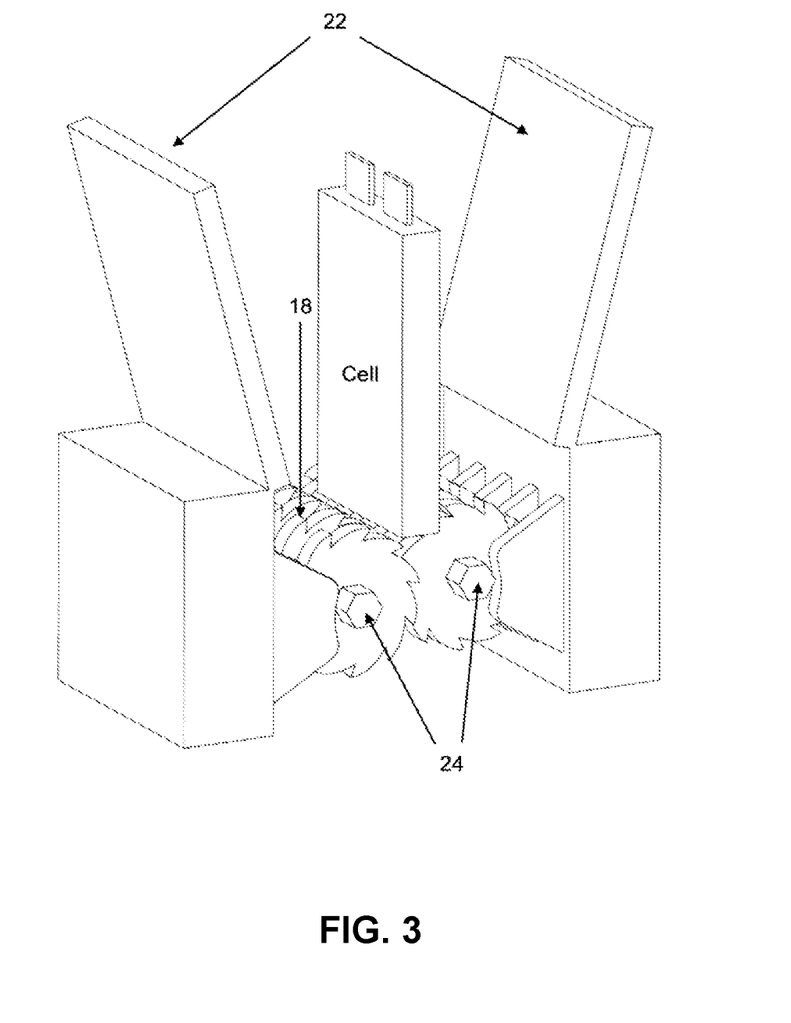
FIG. 3 is a schematic diagram of the invented shredder knives engaging with battery material in accordance with features of the present invention.

FIG. 3 is a view of a plurality of invented shredder knives 10 engaging with and decompiling a pouch cell within a hopper 22. Two knives are shown mounted on two different axles or shafts 24 which are parallel to each other. The knives may overlap each other so that their laterally facing surfaces oppose each other. The knives rotate toward each other so as to pinch the cell between the teeth of the two knives. In the event that there is a blockage in the knives and they stop rotating toward each, the rotation direction can be reversed to free the blockage.

Various teeth patterns are utilized, including but not limited to staggered, chevron, running, and combinations thereof. The views in FIG. 4 show a plurality of knives arranged along a shaft or multiple shafts such that the knives are stacked along side each other such that all of the knives are coaxially arranged with each other along longitudinally extending regions of the shaft 24. The shaft has a circumference that is complementary to the center aperture of each of the knives such that the knives are slidably receive along the shaft. This results in the knives being rigidly but reversibly affixed in relation to the shaft such that the knives do not rotate independently of the shaft. This feature provides a means for arranging the periphery of the knives relative to each other to define different slicing patterns.

Figure 4A:
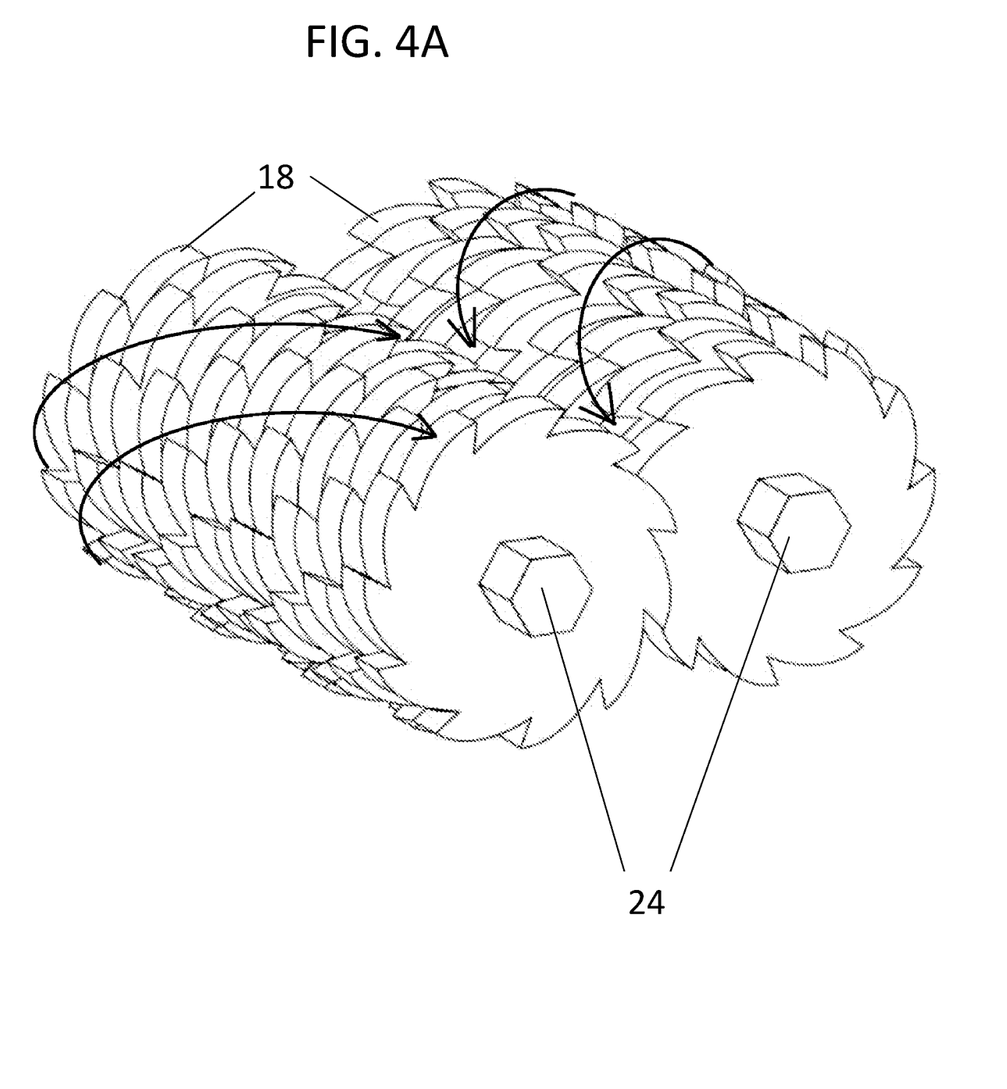
FIG. 4A is an isometric view of two sets of coaxially arranged knives rotating toward each other, each set supported on its own shaft 24; in accordance with features of the present invention.
Figure 4B:
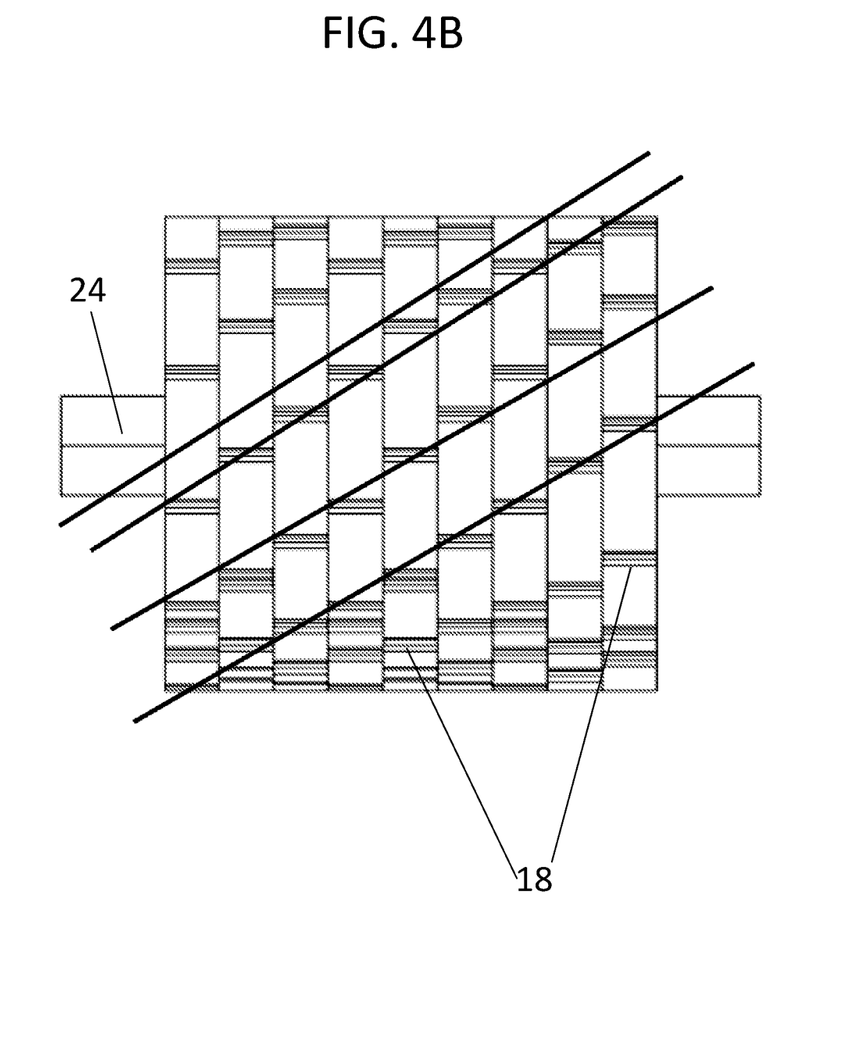
FIG. 4B is a side view of one set of coaxially arranged knives depicted in FIG. 4A having a running pattern, in accordance with features of the present invention.

FIGS. 4A and 4B show knife tips arranged in a running pattern, as expressed by the arrows. FIG. 4A is an isometric view of two knives rotating toward each other, each knife supported on its own shaft 24. The teeth rotating path is helical in shape. FIG. 4B is a side view of one of the knives.

Figure 4C:
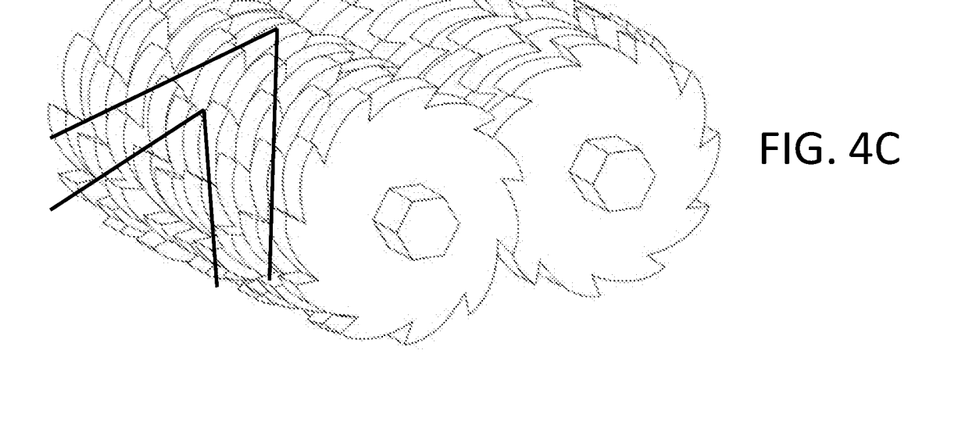
FIG. 4C is an isometric view of two sets of coaxially arranged knives rotating toward each other in a chevron pattern.
Figure 4D:
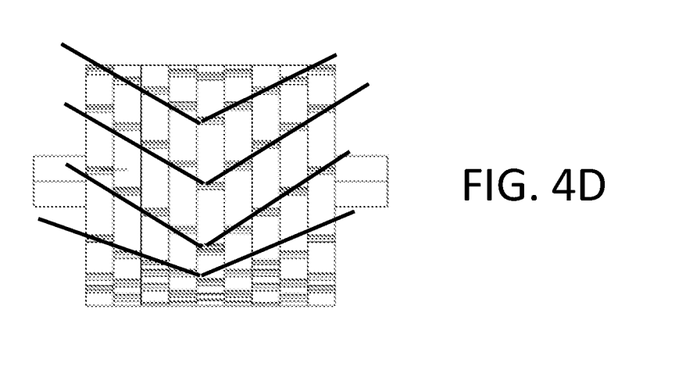
FIG. 4D is a side view of one set of coaxially arranged knives depicted in FIG. 4C having a chevron pattern.

FIGS. 4C and 4D illustrate knife tips configured in a chevron ("v" shaped) pattern. A staggered pattern is a yet a third configuration that involves a more randomized repeating of pattern choice.

Operation Detail

As depicted in FIG. 3, end of life batteries are fed into the hopper 22 of the shredder using a bulk transport means such as a conveyor belt. The batteries are positioned in the hopper belt such that one layer of cells is fed into the length of the hopper 22 at a time. This is aimed to prevent stacking of batteries in the shredder and contact of batteries with one another which can lead to short circuiting and possibly thermal runaway events (e.g., heat increase within a cell that can cause venting of organic solvent, fire, and explosions). In an embodiment of the process, the resulting feed scheme should include a continuous stream of singular batteries/modules/cells so as to maintain a consistent shredding position resulting in an organized, single pass (once through the shredder knives) size reduction process.

One way to ameliorate the fire hazard is to perform the shredding operations in an inert atmosphere (e.g., the absence of ambient air) such as under nitrogen, or even more cost effectively, under water or other fluid such as nitrogen, argon, carbon dioxide, or combinations thereof.

Preferably, one layer of batteries passes through the shredder before another is introduced. The feed rate of the conveyor is controlled to coincide with the rate at which batteries pass through the shredder blades.

Battery feeding may take place under ambient temperature and pressure. Cells fed into the shredder may be at room temperature or as low as the temperature of liquid nitrogen. Lowering the temperature of the battery will essentially deactivate it (particularly by freezing the electrolyte and preventing the transfer of ions within the battery) and render it safe for shredding. Battery temperatures of between 25° C. and minus 200° C. and preferably between −20° C. and minus 175° C. provides safe procedures. The inventors envision loading batteries which have a loading temperature of at least as low as minus 60° C., and preferably as low as minus 125° C.

Figure 5:
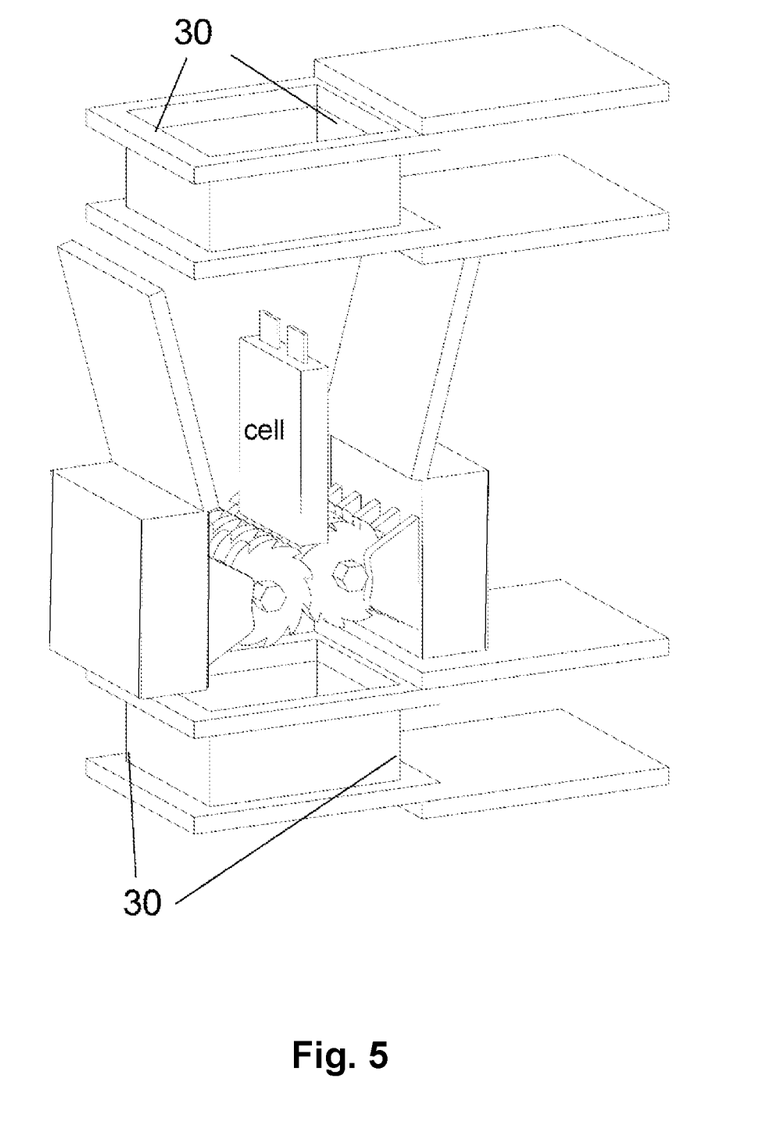
FIG. 5 is a schematic diagram of the invented shredder with optional air locks for maintaining an inert atmosphere.

The shredding may also take place under inert atmosphere to reduce the amount of oxygen present and reduce the risk for fires or explosions. A myriad of liquids or gases, non-reactive to battery components can be utilized to establish an inert atmosphere within the shredder. Such fluids may include nitrogen, argon, carbon dioxide, water, diethylene glycol diethyl carbonate, dimethyl carbonate, and combinations thereof. Gases may flow directly through the shredder. Conversely, "air" locks 30 can be incorporated above and below the shredding area to reduce the amount of gas consumed, as shown in FIG. 5. However, to facilitate smooth operation, the "air" locks may have to be purged each time they are opened and new material is introduced, unless a positive flow out of the locks is maintained during loading.

The shredded battery material, specifically the anode and cathode laminate shred that has yet to be delaminated, can be processed in any manner necessary to achieve clean black mass. Example processes include screening fines away from the laminates, rinsing electrolyte and contaminant particles off of the laminates, delaminating the active powders from the collector foils using thermal, chemical or mechanical means, and finally screening and collection of the black mass from the collector foils.

Figure 6A:
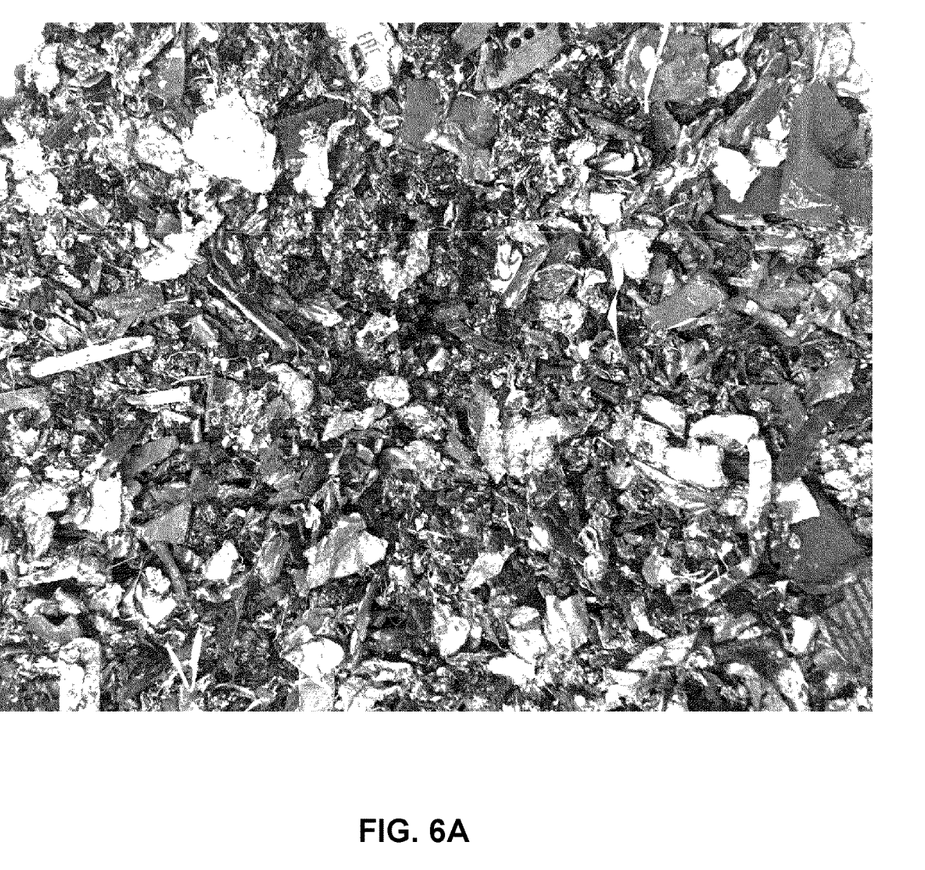
FIG. 6A is a photograph of batteries size reduced using state of the art size reduction equipment.
Figure 6B:
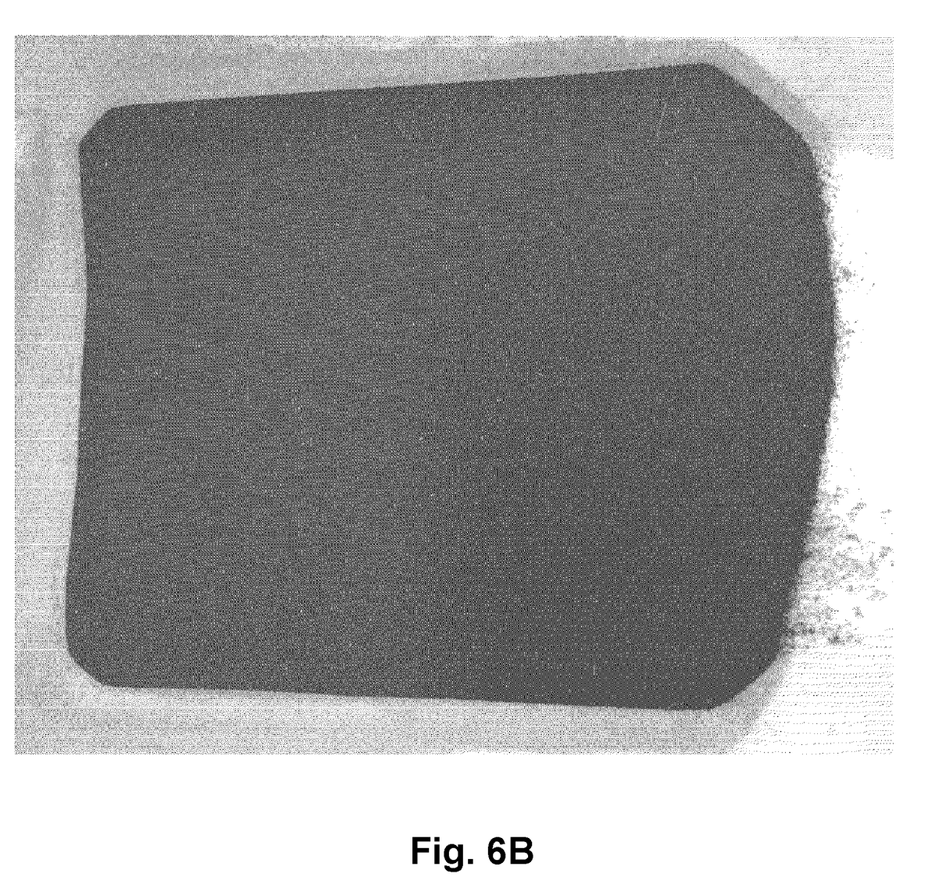
FIG. 6B is a photograph of black mass from size reduced batteries using state of the art size reduction equipment.

FIG. 6A is a photograph of batteries size reduced using state of the art size reduction equipment while FIG. 6B is a photograph of the black mass produced from size reduced batteries using state of the art equipment. The size reduced batteries using state of the art equipment show pieces of battery components (e.g., plastics, metals, casing, electrodes) with a wide range of sizes which can make downstream processing and separation challenging. In addition, the process mechanically removes the electrodes from foil which makes it challenging to remove any impurities from the black mass after the size reduction process. It is clear that the black mass in FIG. 6B is contaminated with fine particles of the battery components.

Figure 6C:
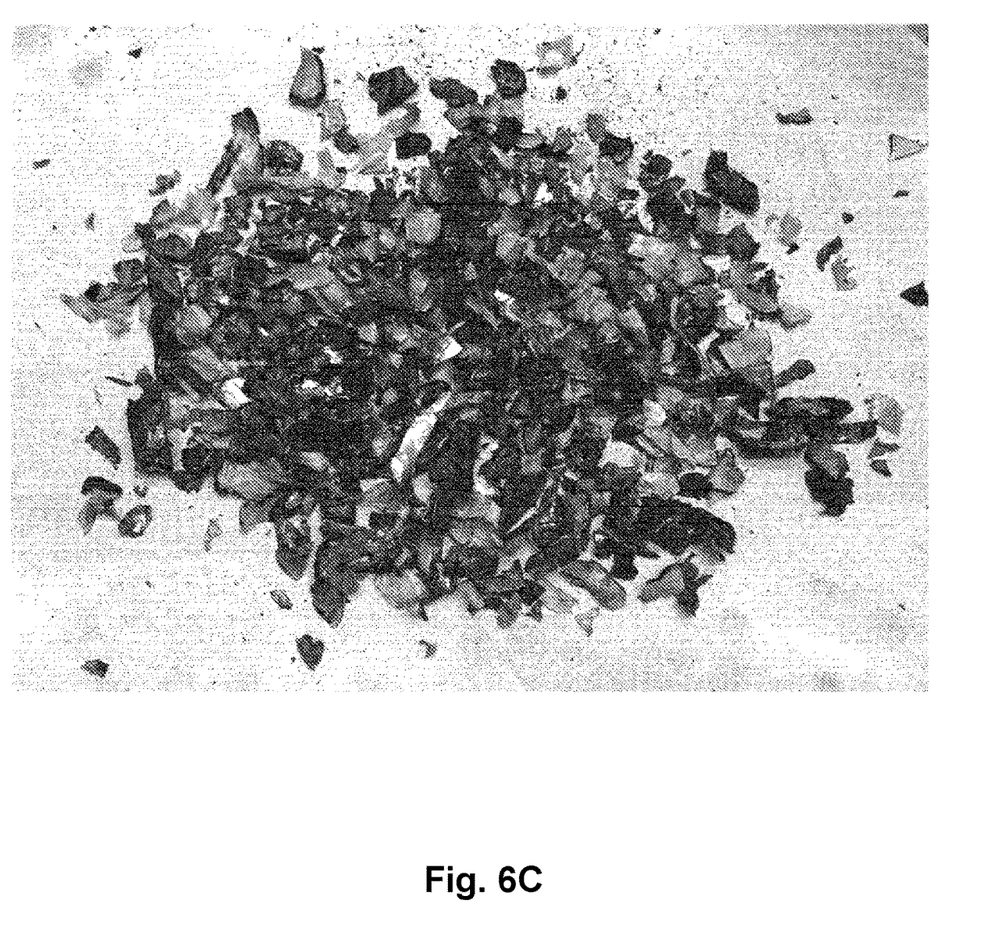
FIG. 6C is a photograph of batteries processed using the invented shredder configuration, in accordance with features of the present invention.
Figure 6D:
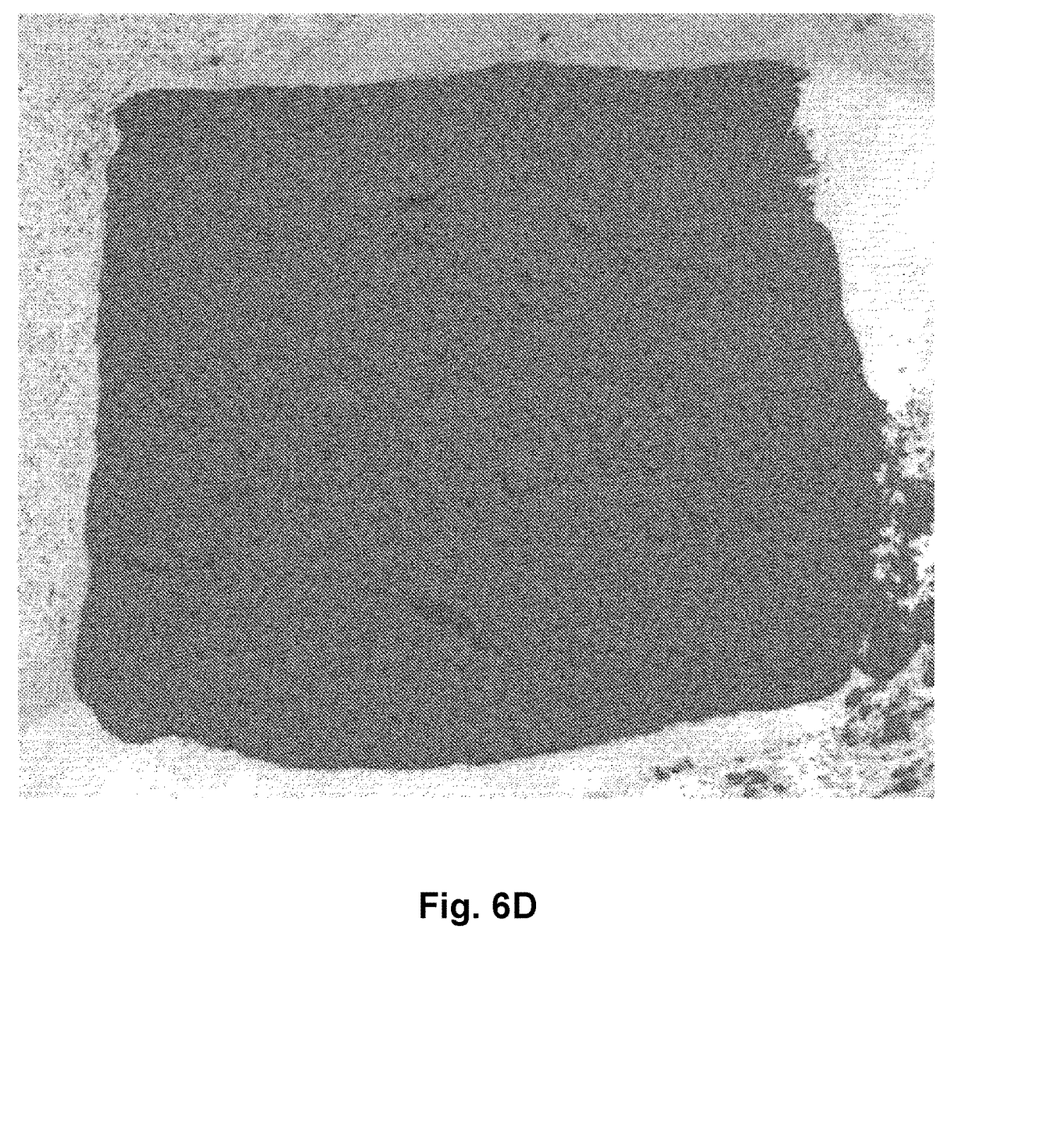
FIG. 6D is a photograph of black mass from shredded batteries using the present invention.

FIG. 6C is a photograph of batteries processed using the invented shredder configuration, in accordance with features of the present invention. FIG. 6D is a photograph of black mass produced from shredded batteries using the present invention. The size reduced batteries using the invented shredder configuration show battery components that are similar in size with a relatively small amount of fine particle contamination. Once the fine particles are sieved or rinsed from the shredded material, the black mass in FIG. 6D is produced which is visually and analytically higher purity than that from the state of the art.

EXAMPLE

An embodiment of the system and method includes the following experimental parameters:
  Shredding knife 4.7 inches in diameter and 11 teeth;
  2-shaft shear shredder operating at 30 RPM;
  Running Knife pattern;
  40 Ah commercial pouch cells approximately 10" wide×10" long×W thick.

The results from the above example included that almost 90 weight percent of pieces were above 2.8 mm in size. After sieving fines particles from the shredder battery material, processed black mass was greater than 99 percent pure. Much of the fines were removed with sieving.

The inventors have observed that where no shredder screen is used in the shredder, less contaminated fines are produced. As such, a screen-less hopper optimizes the generation of particles larger than 500 microns.

The material of the shredder and knives maybe made of any rigid material, such as steel, stainless steel, titanium, or diamond tipped knives.

Fire suppression can be used in and around the shredder in case of fire.

Any fines generated from shredding may be removed through screening, rinsing, etc. This optimizes the generation of such a clean material to delaminate, further improving purity of the black mass, It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which a exclusive property or privilege is claimed is defined as follows:

1. A direct recycling method for producing contaminant free battery material from a whole battery, the method comprising: subjecting the whole battery to a single pass shredding step to produce shredding residue, wherein less than 5 weight percent of the shredding residue is less than 500 microns in diameter, wherein the shredding process utilizes knives having tips spaced from each other a distance equal to a width of the teeth, and the laminates have an aspect ratio between 2:1 and 1:1 with a single pass of the whole battery through the shredding process.

2. The method as recited in claim 1 wherein the method occurs in the absence of ambient air.

3. The method as recited in claim 1 wherein the method occurs at a pressure between 0 and −30 psig.

4. The method as recited in claim 1 wherein the method occurs below the freezing point of electrolyte present in the intact battery.

5. The method as recited in claim 1 wherein the laminates comprise current collector foil laminated with electrode powder.

6. The method as recited in claim 1 wherein the shredding process utilizes a shredding knife having a diameter of 4.7 inches and 11 teeth rotating at between 5 and 400 rpm.

7. The method as recited in claim 6 wherein the teeth are positioned on a periphery of a rotating knife and each of said teeth define an edge arranged at between 15 degrees and 45 degrees relative to an arc formed by the periphery.

8. The method as recited in claim 7 wherein the knife rotates about a single shaft.

9. The method as recited in claim 7 wherein the teeth have a running path in a shape selected from the group consisting of a helix, a chevron, a staggered pattern, and combinations thereof.

10. The method as recited in claim 1 wherein the battery has a configuration selected from the group consisting of a pouch, a cylinder, a prism, and combinations thereof.

11. The method as recited in claim 1 wherein the laminates are thermally or chemically treated to generate powders from the laminates.

12. The method as recited in claim 11 wherein the powders comprise clean black mass.

* * * * *